United States Patent [19]

Anderson

[11] Patent Number: 4,770,436

[45] Date of Patent: Sep. 13, 1988

[54] ADJUSTABLE POSITION TRAILER HITCH

[76] Inventor: Alan D. Anderson, 1721 Melody Dr., Midwest City, Okla. 73130

[21] Appl. No.: 87,551

[22] Filed: Aug. 19, 1987

[51] Int. Cl.$^4$ .............................................. B62D 13/00
[52] U.S. Cl. ................................. 280/463; 280/479 R; 280/DIG. 9; 280/DIG. 14
[58] Field of Search ................... 280/463, 474, 479 R, 280/478 R, 478 A, DIG. 9, DIG. 14

[56] References Cited

U.S. PATENT DOCUMENTS

| | | | |
|---|---|---|---|
| 2,873,982 | 2/1959 | Graham | 280/478 R |
| 3,362,085 | 1/1968 | Clifford et al. | 280/482 X |
| 3,521,908 | 7/1970 | Carter | 280/479 R |
| 4,153,132 | 5/1979 | Biedebach | 280/DIG. 9 |

FOREIGN PATENT DOCUMENTS

| | | | |
|---|---|---|---|
| 492300 | 2/1930 | Fed. Rep. of Germany | 280/478 R |
| 1176642 | 4/1959 | France | 280/482 |

Primary Examiner—John A. Pekar
Attorney, Agent, or Firm—Robert K. Rhea

[57] ABSTRACT

A drawbar type trailer hitch comprising a frame supported telescoping tongue extended and retracted by a first pressure cylinder while a second pressure cylinder may be operated to position the rearward end portion of the telescopically extended tongue in a lateral direction for correcting the direction of rearward movement of a towed vehicle being backed toward a parked position by the towing vehicle.

1 Claim, 2 Drawing Sheets

ADJUSTABLE POSITION TRAILER HITCH

BACKGROUND OF THE INVENTION

1. Field of the Invention

The present invention relates to trailer hitches and more particularly to a vehicle coupling apparatus having a power cylinder operated laterally adjustable and extensible tongue.

Considerable practice is required for a driver to develop the skill of accurately positioning a trailer in backing it toward a desired parked position by the manipulation of the towing vehicle. Many experienced truck drivers have no problem in backing or parking trailers. Sometimes even experienced drivers have difficulty in positioning the trailer where desired.

This invention provides a hitch which permits the driver of the towing vehicle to adjust the coupling connection between the two vehicles in a lateral direction independent of the movement of the vehicles as an aid in changing the direction of the towed vehicle during rearward movement.

2. Description of the Prior Art

Prior patents disclose several variations of pivoting or laterally movable vehicle coupling apparatus comprising an elongated tongue connected at its forward end to the towing vehicle and normally maintained in a forward to rearward direction which may be released to move laterally with respect to the direction of travel for various purposes such as for making sharp turns of the vehicles.

This invention is believed distinctive over prior art patents by providing a trailer hitch frame supporting an elongated telescoping tongue, connected at its rearward end with the towed vehicle, and which may be extended and retracted or moved in lateral directions with respect to the direction of travel by power operated cylinder members.

SUMMARY OF THE INVENTION

A generally rectangular open frame is horizontally disposed between a towing vehicle and a towed vehicle. The frame comprises a superposed pair of forward members transversely secured to the rearward end portion of the towing vehicle and a pair of superposed rearward members parallel with the forward members and secured thereto by brace members. An elongated telescoping tongue extends in interposed relation between and beyond the rearward and forward limits of the frame end members medially their length. The forward end portion of the tongue is pivotally connected with the forward frame members for horizontal swinging movement of its respective end portions.

A first pressure operated cylinder is connected longitudinally with the tongue for extending and retracting it and a second cylinder is connected between the forward end of the tongue and the frame for horizontally pivoting the tongue.

The principal object of this invention is to provide a trailer hitch frame having an elongated towed vehicle connected tongue forcibly moved laterally a predetermined distance in either direction from a towing vehicle cab control position to assist the driver in positioning a towed vehicle when backing it to a selected location.

DESCRIPTION OF THE PREFERRED EMBODIMENTS

Figures 1, 2:
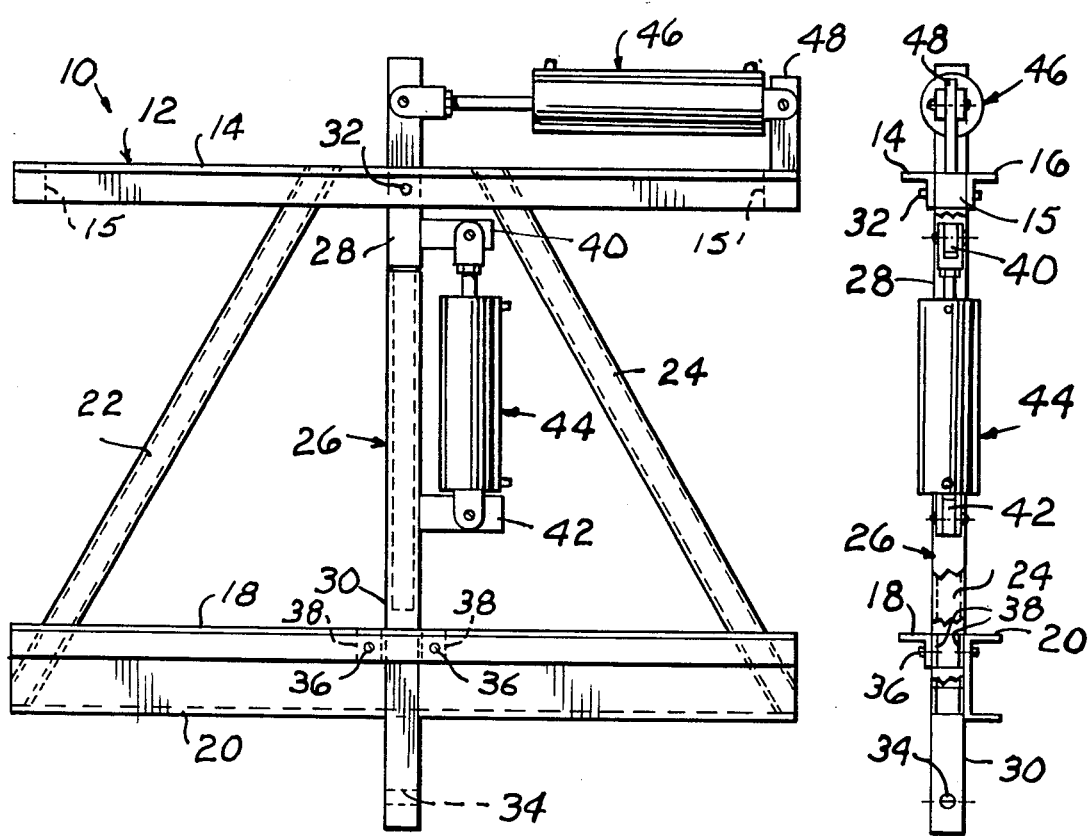
FIG. 1 is a top view of the trailer hitch.
FIG. 2 is a right side elevational view with a portion of one brace broken away for clarity.
Figures 3, 4:
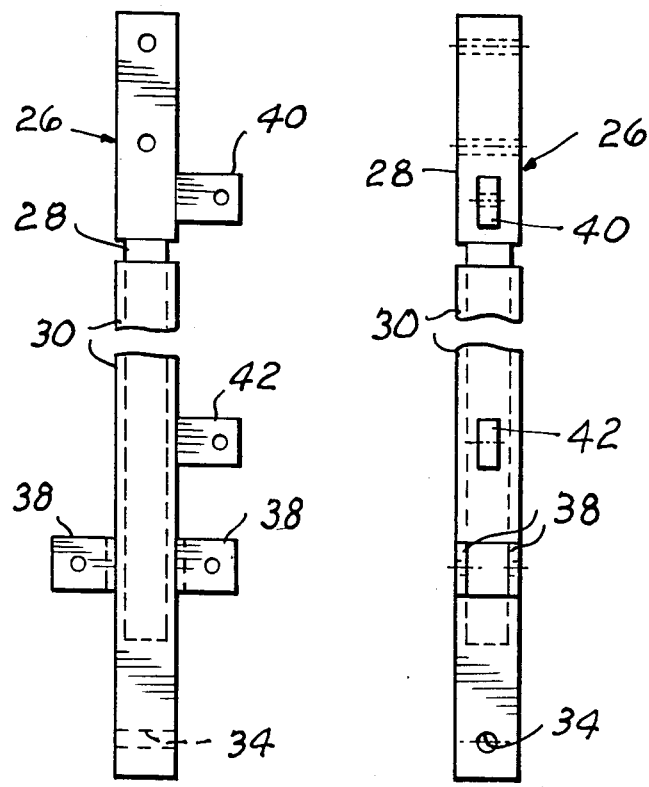
FIG. 3 is a fragmentary top view of the trailer hitch tongue, per se.
FIG. 4 is a right side elevational view of FIG. 3.

Like characters of reference designate like parts in those figures of the drawings in which they occur.

In the drawings:

The reference numeral 10 indicates a trailer hitch apparatus, as a whole, for coupling a towing vehicle to a towed vehicle, neither of which are shown. The hitch 10 comprises a generally rectangular open frame, indicated at 12, formed by a first or forward pair of horizontal angle iron members 14 and 16 disposed in vertically spaced parallel relation and adapted to be secured to the rearward end of a towing vehicle, such as its frame. Spacer blocks 15 may be interposed between the respective end portions of the members 14–16, if needed. The frame further includes a second or rearward pair of angle members 18 and 20 of equal length with respect to each other and the pair of forward members 14 and 16. The rearward members 18–20 are horizontally disposed in vertically spaced relation parallel with and spaced rearwardly of the forward members a selected distance. A pair of tubular brace members 22 and 24 extend forwardly from the respective ends of the rearward members 18 and 20 in converging relation and are rigidly secured between the rearward and forward members which substantially completes the frame 12.

Elongated telescoping tongue means 26, comprising an inner member 28 and an outer member 30, extends longitudinally between and beyond the rearward and forward frame members medially their length. The forward end portion of the inner member 28 is pivotally secured as by a bolt 32 extending vertically through the inner tongue member 28 and the frame end members 14 and 16 to form a vertical axis for horizontal pivoting movement of the respective end portions of the tongue means 26 about the axis of the bolt 32. The forward tubular end portion of the outer tongue 30 slidably receives the rearward end portion of the inner tongue 28 and its rearward end portion is provided with an aperture 34 as a means for connection with the towed vehicle. Obviously the axis of the aperture may be vertically disposed for receiving the shank of a ball hitch, not shown, if desired. The tongue means 26 is normally maintained in the solid line position of FIG. 1 for over-the-road travel of the vehicles by a pair of pins 36 extending vertically through line drilled apertures formed through the rearward frame members 18 and 20 and a pair of laterally projecting tabs 38 rigidly secured to opposing sides of the outer tongue member 30.

Lugs 40 and 42, secured respectively to the inner tongue 28 adjacent the forward frame members 14 and 16 and to the outer tongue member 30 intermediate its ends, support respective end portions of a first pressure operated double acting cylinder 44. The purpose of the cylinder 44 is to extend and retract the outer tongue member 30 with respect to the inner tongue 28 from the position shown in FIG. 1 to the telescopically extended position illustrated by FIG. 5. A second double acting pressure cylinder 46 has its piston rod end pivotally connected with the end portion of the inner tongue 28 projecting forwardly beyond the front frame members 14 and 16 with the base end of the cylinder 46 pivotally connected with a lug 48 secured to the adjacent frame end filler block 15. The purpose of the pressure cylinder 46 is to pivot the rearward end portion of the tongue means in a selected lateral direction when the pins 36 are removed.

OPERATION

The trailer hitch apparatus 10 is connected with a towing and towed vehicle as described hereinabove and the pressure cylinders 44 and 46 are connected with a source of fluid pressure usually provided by towing vehicles, such as truck tractors. Normally the pins 36 are in place on opposite sides of the tongue means 26 for over-the-road travel of the vehicles.

Figure 5:
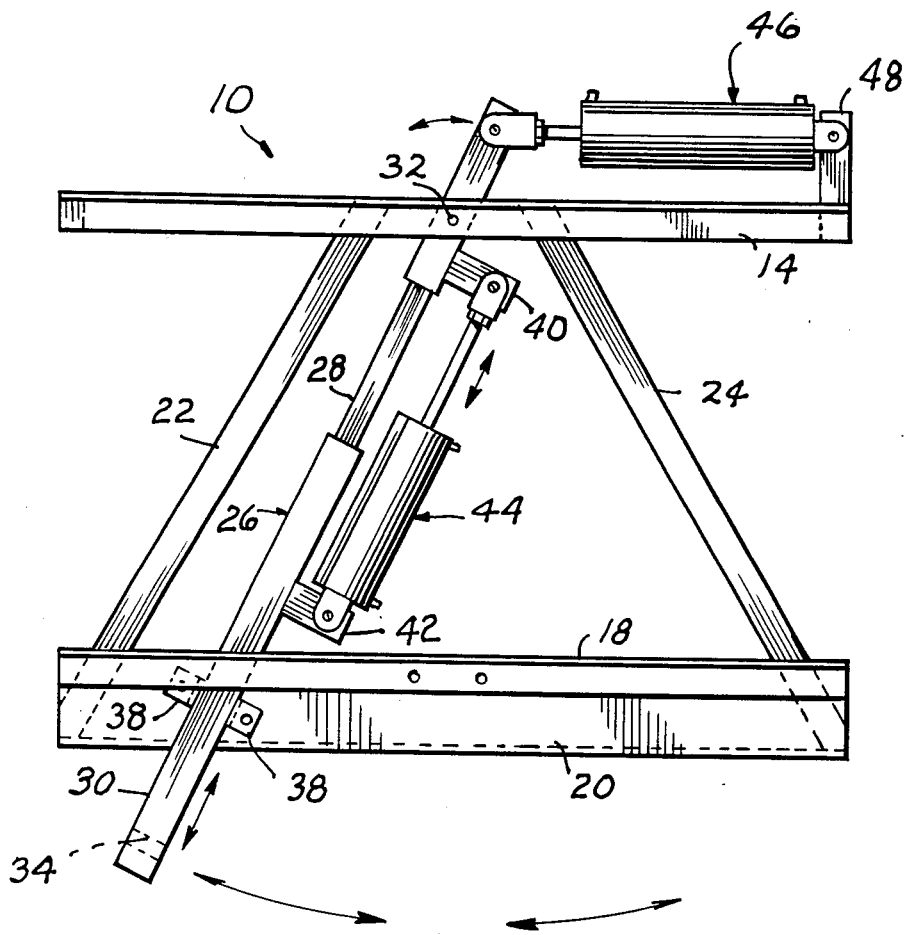
FIG. 5 is a top view similar to FIG. 1 illustrating trailer hitch tongue extended and lateral movement.

When it is desired to back the trailer, not shown, to a loading dock or into a specified parking space the towing vehicle operator operates controls, not shown, to extend the piston rod of the cylinder 44, after first removing the tongue locking pins 36, which extends the effective length of the tongue means, such as is illustrated by FIG. 5. The other cylinder 46 is similarly operated to extend or retract its piston rod and pivot the rearward end portion of the tongue means 26 to the right or left as viewed in FIG. 5. This movement is accomplished during movement of the two vehicles which adjustably changes the direction of movement of the towed vehicle relative to the normally expected direction of towed vehicle travel while the towing vehicle continues in its previous direction of rearward movement. The lateral movement of the rearward end portion of the tongue means 26 also facilitates connecting the tongue with the towed vehicle when the two vehicles are not cooperatively positioned in a hitch coupling position.

Obviously the invention is susceptible to changes or alterations without defeating its practicability. Therefore, I do not wish to be confined to the preferred embodiment shown in the drawings and described herein.

I claim:

1. A towing apparatus for coupling a towed vehicle to a towing vehicle, comprising:
   first elongated members for attachment in horizontal superposed spaced relation to the rearward end of a towing vehicle;
   elongated extensible tongue means comprising an inner tongue portion connected at one end portion between said first members and projecting rearwardly therefrom and a tubular outer tongue portion telescopically receiving the inner tongue member and projecting rearwardly for connection with a towed vehicle and horizontal pivoting movement of the tongue means about a vertical axis;
   second elongated superposed members extending transversely of the rearward end portion of said tongue means in parallel relation with respect to said first members and in over and underlying relation with respect to said tongue means;
   brace means comprising a pair of tubular members each connected at one end portion between said first members on opposite sides of said tongue and horizontally diverging rearwardly into the space between said second members at their respective end portions for rigidly interconnecting said first and second members;
   first power cylinder means connected at its respective ends with said inner tongue and said outer tongue for telescopically extending and retracting the outer tongue relative to the inner tongue;
   second power cylinder means connected with said tongue means for pivoting respective end portions of said tongue means in a selected direction;
   tongue anchor means including a pin extending through cooperating apertures in said second members on opposing sides of said tongue means for normally preventing lateral movement of said tongue means relative to said second members; and,
   at least one vertically apertured tab horizontally secured to the side of said tongue means for receiving said pin when in register with the second members cooperating apertures.

* * * * *